US008292033B2

(12) United States Patent
Hale

(10) Patent No.: US 8,292,033 B2
(45) Date of Patent: Oct. 23, 2012

(54) TREE STAND

(76) Inventor: Jeff Hale, Spiro, OK (US)

(*) Notice: Subject to any disclaimer, the term of this patent is extended or adjusted under 35 U.S.C. 154(b) by 200 days.

(21) Appl. No.: 12/801,152

(22) Filed: May 25, 2010

(65) Prior Publication Data
US 2010/0300808 A1 Dec. 2, 2010

Related U.S. Application Data

(60) Provisional application No. 61/213,370, filed on Jun. 2, 2009.

(51) Int. Cl.
*A01M 31/02* (2006.01)
(52) U.S. Cl. ........................................ 182/187; 182/188
(58) Field of Classification Search .................. 182/187, 182/188
See application file for complete search history.

(56) References Cited

U.S. PATENT DOCUMENTS

| 4,236,602 A * | 12/1980 | Leggett ........................ 182/187 |
| 4,557,458 A * | 12/1985 | Vahlberg et al. ............... 248/553 |
| 4,727,961 A * | 3/1988 | Dawson ........................ 182/187 |
| 4,782,918 A | 11/1988 | Brunner et al. |
| 5,060,756 A * | 10/1991 | D'Acquisto .................. 182/187 |
| 5,143,177 A | 9/1992 | Smith |
| 5,409,083 A | 4/1995 | Thompson et al. |
| 5,515,943 A | 5/1996 | Antonelli |
| 5,562,180 A | 10/1996 | Herzog et al. |
| 5,680,910 A * | 10/1997 | Sarphie, IV ................... 182/135 |
| RE36,276 E | 8/1999 | Smith |
| 5,954,158 A * | 9/1999 | Concepcion .................. 182/187 |
| 6,196,354 B1 | 3/2001 | Anthony et al. |
| 6,367,585 B1 | 4/2002 | Fast |
| 7,377,361 B1 * | 5/2008 | Tschida ........................ 182/188 |
| 2006/0054397 A1 * | 3/2006 | Pringnitz ...................... 182/187 |
| 2007/0151803 A1 | 7/2007 | D'Acquisto |

* cited by examiner

*Primary Examiner* — Alvin Chin Shue
(74) *Attorney, Agent, or Firm* — Richard C. Litman

(57) ABSTRACT

The tree stand includes a column permanently or semi-permanently secured to a tree or other support by one or more circumferential cables or bands and/or one or more threaded fasteners driven into the tree. The ends of the band are captured in a slot on the column, the threaded fastener, or optionally an unthreaded pin, capturing the ends of the band in the slot. Access to the pin is blocked by a lock that may only be removed by a person having the proper key, thus assuring that the column can be safely left in place. A platform and seat are removably attached to the column when use of the stand is desired. The user of the stand may install several columns in various locations and transport only a single platform and seat to one of the previously installed columns when the stand is to be used.

17 Claims, 6 Drawing Sheets

TREE STAND

CROSS-REFERENCE TO RELATED APPLICATION

This application claims the benefit of U.S. Provisional Patent Application Ser. No. 61/213,370, filed Jun. 2, 2009.

BACKGROUND OF THE INVENTION

1. Field of the Invention

The present invention relates generally to stands used by hunters, wildlife observers and photographers, and the like, and more particularly to a tree stand having a fixed component that is permanently attached to the tree, and a platform and seat removably secured to the permanently attached component.

2. Description of the Related Art

The general concept of elevating a hunter, photographer, or observer of wildlife has been known for some time. The concept involves the principle that most ground-based wildlife, e.g., deer, etc., generally do not elevate their view significantly above the horizon, as they have learned that most threats are on the same plane as they are and do not arrive from above. Accordingly, hunters have found it much easier to sit in wait in an elevated tree stand for game to approach, and wildlife observers and photographers have also found it much easier to observe and photograph wildlife from an elevated tree stand.

As a result, a number of different types of tree stands have been developed for use by hunters and others interested in wildlife. Some such stands are equipped with a ladder or other means enabling the user to climb to the stand once it has been secured at the desired level. Others are self-climbing stands, capable of being ratcheted up the tree by the user as he or she climbs the tree using the stand. Perhaps the majority of stands are configured for installation about the trunk of a tree, with any ladder or other climbing gear being ancillary to the stand.

Such stands usually include some structure that is attached directly to the tree, a platform, and a seat, although either the platform or seat may be omitted for some very light weight and simple stands. While most manufacturers of such stands make reasonable efforts to reduce the weight of the stand assemblies insofar as possible while avoiding the use of costly exotic materials, it will be seen that a stand assembly including components for secure attachment to the tree, a platform, and a seat, results in a fair amount of weight. This assembly must be carried to the desired site, carried up the trunk of the tree and installed on the tree at each site where the user wishes to observe the wildlife, and then removed and carried back out from the site to a vehicle for transport or to a storage facility for future use. While some of this work might be carried out by a small all-terrain vehicle or the like, it is still generally necessary to park such a vehicle at some distance from the site where the stand is erected in order to avoid alerting the game to human presence.

An alternative to the work presented by removing and erecting the stand each time a hunting or observation session is desired is to leave the stand erected permanently at a site that has proven successful in the past. However, this alternative requires the hunter or observer to erect multiple stands at multiple locations, if it has been found that such multiple locations produce better results at different times. This is obviously quite costly in comparison to having only a single stand. Another drawback to such an arrangement is that a stand left unattended may be seen as abandoned property, and taken by some other individual. This is clearly not a desirable possibility, and as a result, most persons using tree stands will accept the labor involved in removing the stand after each use and carrying it from the site. This is obviously a laborious and time consuming task, and may limit the use of such tree stands only to those capable of such exertion.

Thus, a tree stand solving the aforementioned problems is desired.

SUMMARY OF THE INVENTION

The tree stand includes a column with separable platform and seat. The column attaches permanently or semi-permanently to a tree or other suitable structure elevating the assembly, while the platform and seat are removably attached to the column to allow the user to remove them and take them to a safe location for storage until further needed. The column may be secured to the tree by one or more threaded screws and one or more circumferential attachment bands, straps, cables, or the like. An additional circumferential security cable or band is locked in place by the threaded screw or, alternatively, by a pin, that captures the security band in a slot in the column structure. The screw or pin, in turn, is precluded from removal from the column and tree by a lock mechanism. Thus, even though the attachment bands may be loosened and removed, the column cannot be removed from its installed site by unauthorized persons without damage to the column and/or its mechanism due to the locked security cable or band. Suitable tools and the proper key must be used to remove the column without damage thereto.

The platform and seat are removably secured to the column. Thus, the hunter, photographer, or observer may carry only the seat and platform to the site where the column is secured and install them upon the previously installed column. When the hunting or other activity has been completed for the day, the user may remove the seat and platform and carry them away from the site for safekeeping.

This arrangement provides a number of advantages for the serious hunter, wildlife photographer, or observer. Such a person may obtain a number of columns and install them permanently upon a number of trees, poles, or the like at various geographically separate sites. The user is assured that the various columns will remain in place, due to the locking system provided. Moreover, the user need only obtain a single platform and seat, and carry those two components to the desired site where he or she has previously permanently installed a support column for the platform and seat.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The tree stand includes a relatively permanently installed component that is immovably affixed to a tree, pole, or other structure with which the stand is to be used and locked in place thereon, and a platform and a seat that are removably attached to the permanently installed component when the tree stand is to be used. The user of the stand may remove the platform and seat to assure their security whenever the stand is not in use.

Figure 1:
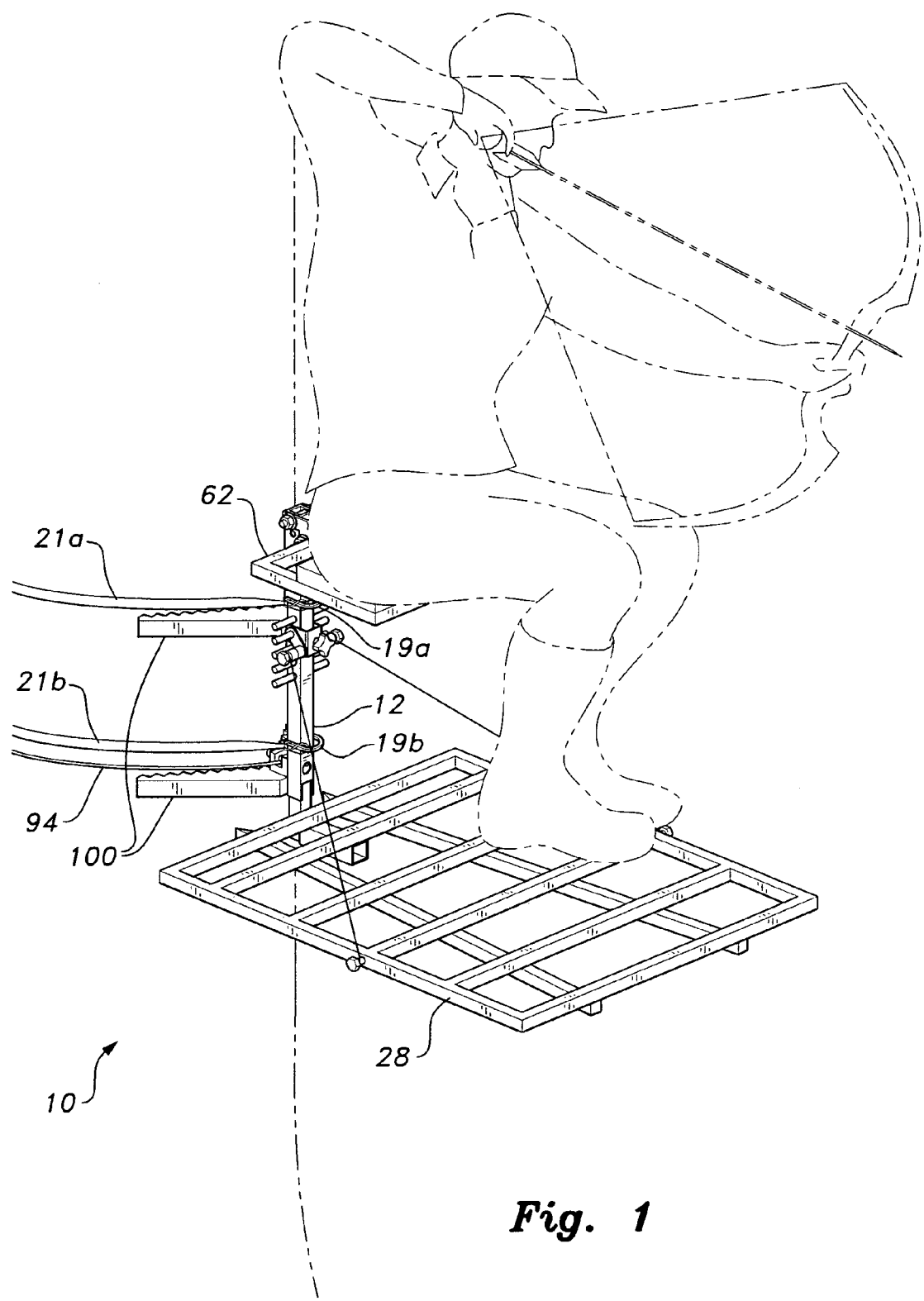
FIG. 1 is an environmental, perspective view of a tree stand according to the present invention, showing its general features and use.

FIG. 1 of the drawings provides an environmental perspective view of the tree stand 10 assembled for use. The stand 10 includes an elongate hollow or tubular post or column 12, details of which are shown in FIGS. 2 through 6 and described below. The column 12 includes a front face 14, opposite rear face 16, and mutually opposed first and second lateral faces. The first lateral face 18 is shown in FIGS. 2 through 6, the opposite second lateral face being symmetrical. Upper and lower attachment band anchors 19a and 19b are shown in FIG. 1, with these anchors providing for the removable attachment of tree attachment bands or straps 21a and 21b that pass circumferentially about the tree. The bands or straps 21a, 21b are secured to their respective anchors 19a, 19b by conventional means (e.g., snap hooks, etc.) and tightened by conventional means (e.g., ratchets, etc.) to secure the column 12 to the tree.

Tree attachment passages, including at least one front passage 20 and at least one rear passage 22 (FIG. 5), are formed through the front face 14 and rear face 16 of the column 12. The passages provide for the installation of a bolt, screw, or retaining pin therethrough for attachment into the tree, and/or for retaining band(s) 94 extending circumferentially about the tree. It will be understood that the retaining band 94 is distinct from the tree attachment bands 21a, 21b, and does not necessarily fit tightly about the tree. The intent of the retaining band 94 is to form a closed and locked loop about the tree, thereby preventing the removal of the column 12 from the tree by unauthorized persons even if the two attachment bands 21a, 21b are removed. In FIG. 1, a lower retaining band 94 is illustrated, but only an upper set of passages 20 and 22 are shown in the various detail drawings of FIGS. 2 through 6. The tree stand 10 may have a plurality of aligned passages spaced apart vertically in the column 12. It will be understood that the specific location of the retaining band 94 is not critical, as it does not act to pull the column 12 tightly to the tree, but only to prevent the removal of the column by unauthorized persons.

The lower end 24 of the column 12 provides for removable attachment of the platform, while the opposite upper end 26 is adapted for the removable attachment of the seat thereto. Specifics of the tree securing system are described in detail further below.

Figure 2:
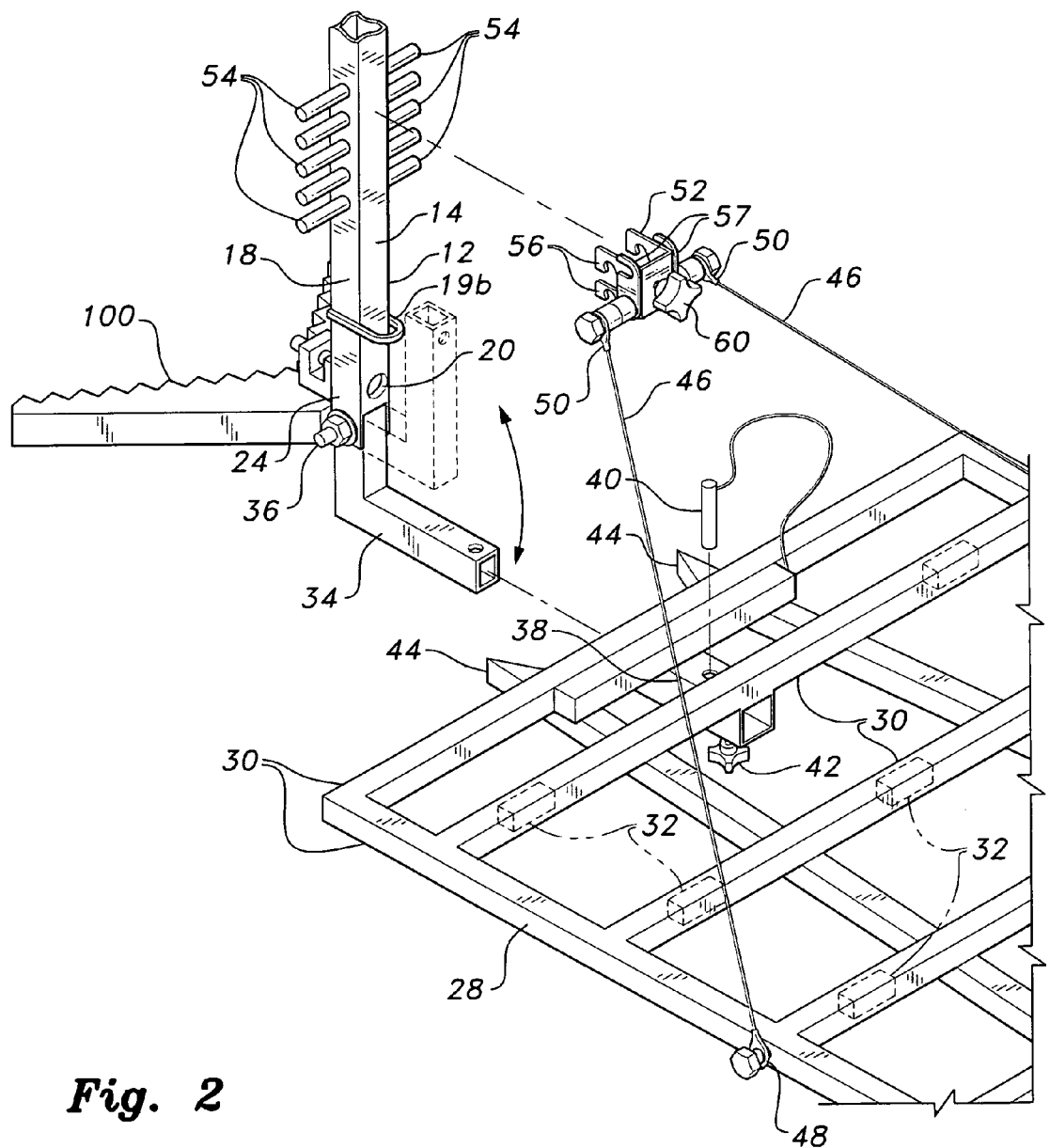
FIG. 2 is an exploded partial perspective of the lower portion of the tree stand of FIG. 1, illustrating details of the platform and its attachment to the column.

FIG. 2 of the drawings shows the structure for the removable attachment of the platform 28 to the lower end 26 of the column 12. The platform 28 may have a rectangular or other polygonal or circular form, and is preferably constructed of a series of spaced apart hollow tubular members 30 in order to reduce the weight as much as practicable while still providing the desired strength. A number of blocks 32 of rubber, foam, or other suitable material may be installed within the tubular members 30 to dampen vibration and resulting sound that might be produced from standing on or otherwise contacting the platform 28.

An angular platform attachment fitting 34 is secured to the lower end 24 of the column 12 by a pivot bolt or pin 36. This allows the fitting 34 to fold closely against the lower end 24 of the column 12 when not needed, and also allows the angle of the platform 28 to be adjusted relative to the column 12 as desired. The inboard end of the platform 28 includes a column attachment receptacle 38, with the receptacle 38 installing removably over the fitting 34. A locking pin 40 is removably installed through the ends of the fitting 34 and receptacle 38 to secure the platform 28 to the column 12. Further security is provided by a threaded lock screw 42 installed in the receptacle 38 of the platform 28. After the receptacle 38 is installed on the fitting 34, the lock screw 42 is tightened to preclude any potential noise making rattling or play between the fitting and receptacle. Additional insurance against unwanted sounds may be provided by installing a thin sleeve of plastic material (not shown) over the platform attachment fitting 34, with the sleeve captured between the fitting 34 and the inside of the receptacle 38 to prevent metal-to-metal contact. The platform 28 further preferably includes a couple of generally longitudinal members having angled or sharpened inboard ends or tines 44 that engage the tree when the platform 28 is installed on the column 12.

Figure 3:
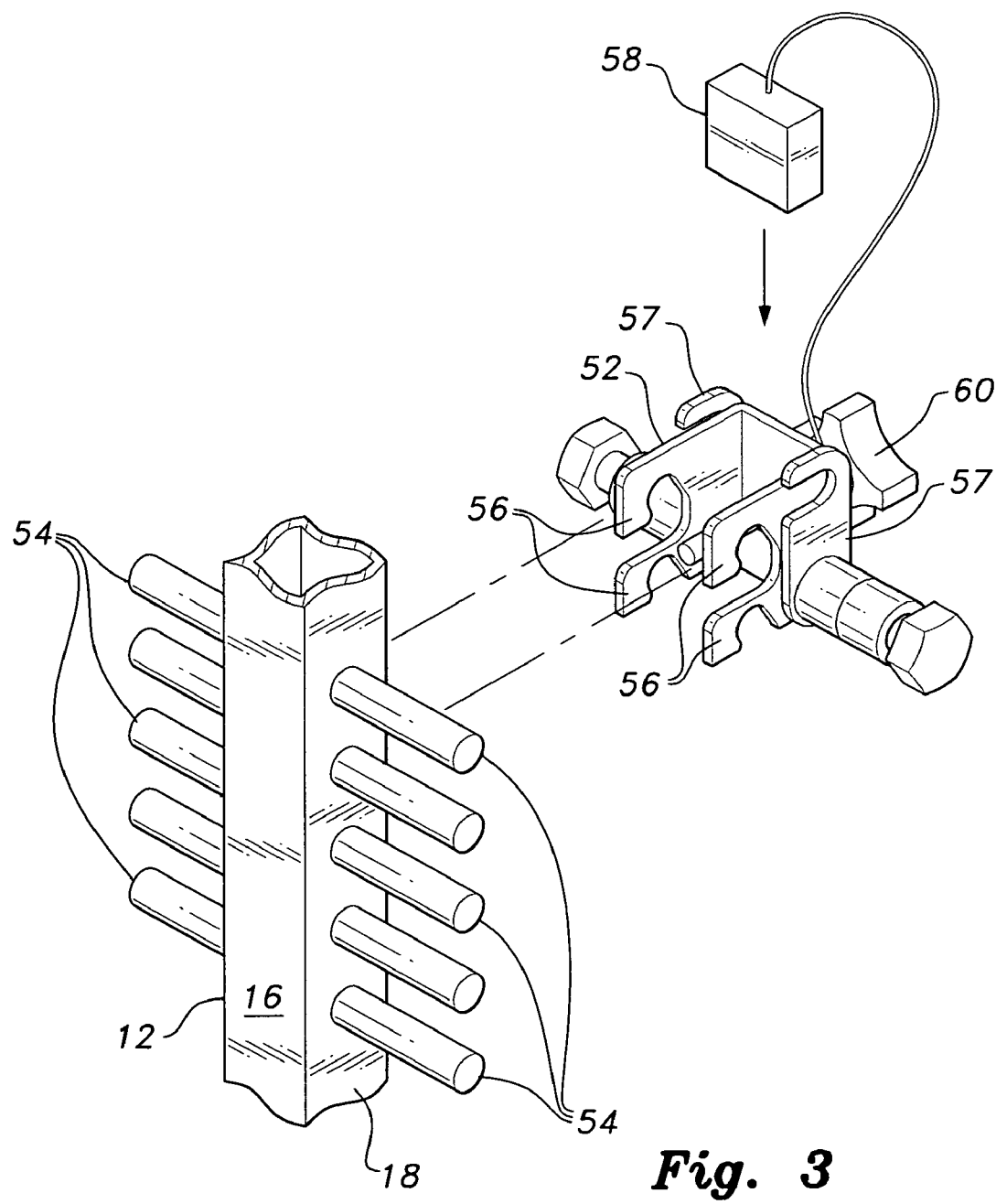
FIG. 3 is an exploded perspective view showing details of the platform attachment bracket of the tree stand of FIG. 1, and attachment of the bracket to the column.

First and second platform stays 46, each comprising a flexible cable, band, or the like, have platform attachment ends 48 secured to the opposite sides or edges of the platform 28 and opposite column attachment ends 50 that attach to a platform stay bracket 52, shown in greater detail in FIG. 3. In the embodiment of FIGS. 2 and 3, the column 12 includes a series of platform stay anchors comprising pins 54 extending laterally from the opposite lateral faces of the column 12. The platform stay bracket 52 includes a pair of pin engagement hooks 56 that secure over a corresponding pair of the pins 54 on each side. The hooks 56 include downwardly and inwardly turned ends to preclude the bracket 52 from slipping from the pins 54 unless intentionally removed.

One or more latches 57 may be pivotally installed upon the lateral bolt or pin extending across the platform stay bracket 52 that serves as an anchor for the column attachment ends 50 of the two platform stays 46. These latches 57 hook over selected ones of the pins 54, with their geometry preventing the platform stay bracket 52 from lifting from its installed position on the pins 54 when the latches 57 are engaged.

Alternatively, a chock 58, shown in FIG. 3, may be placed removably between the inside of the bracket 52 and the front face 14 of the column 12, to prevent the bracket 52 from being displaced toward the column 12 and disengaging the bracket hooks 56 from the anchor pins 54 of the column 12. A lock screw 60, similar to the lock screw 42 for the platform attachment receptacle 38, may be provided through the bracket 52 to provide better security for the assembly and to preclude rattling and noise from the assembled components. It will be seen that the five pins 54 extending to each side of the column 12, and the two hooks 56 to each side of the bracket 52, are exemplary, and that more or fewer such pins and hooks may be provided. Alternative platform stay bracket attachment means may be provided, e.g., a lateral pin or pins that pass through holes in the sides of the bracket and corresponding lateral holes through the column 12.

Figure 4:
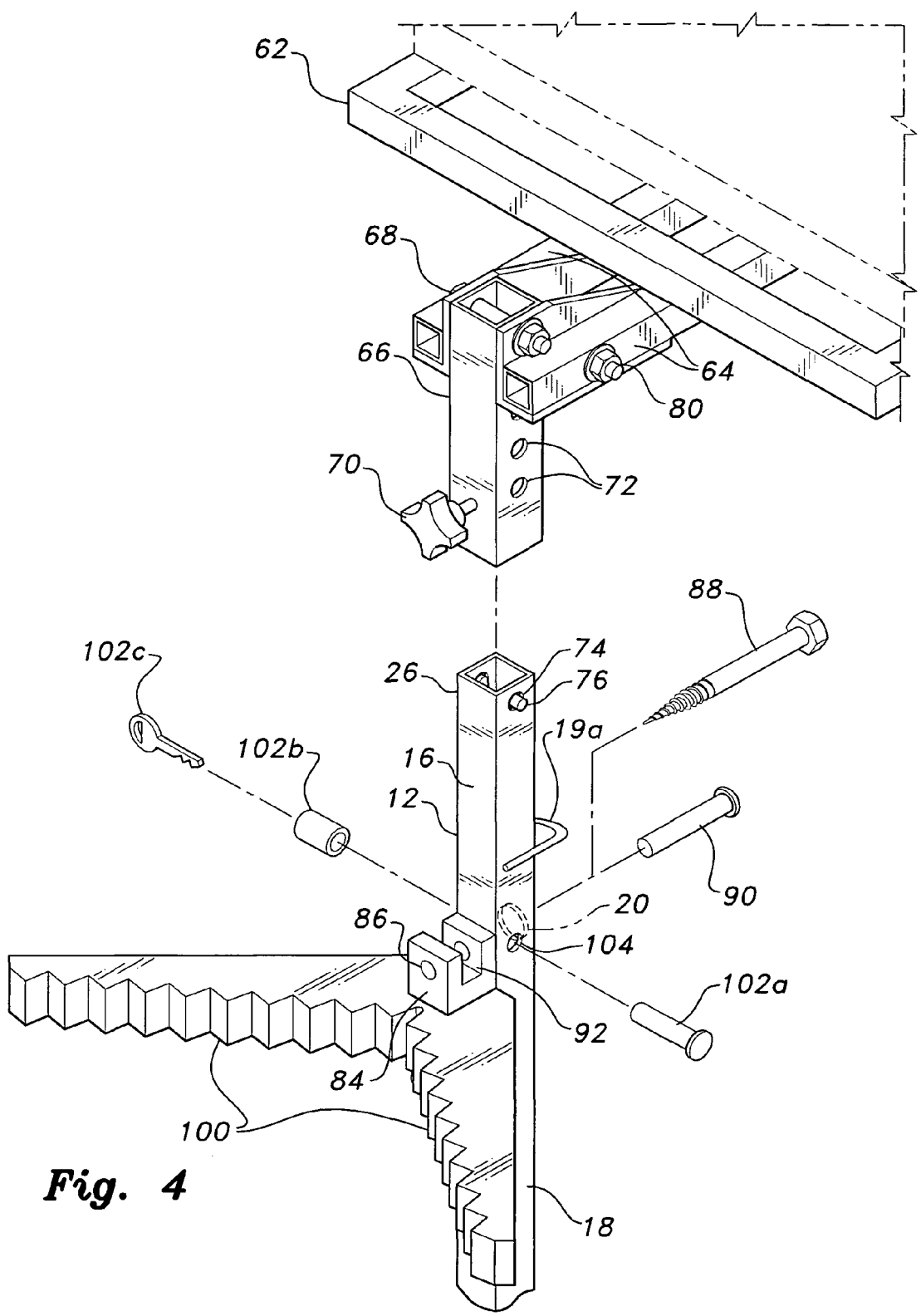
FIG. 4 is an exploded perspective view of the upper end of the column of the tree stand of FIG. 1, showing details of the removable seat frame and its attachment to the column.
Figure 5:
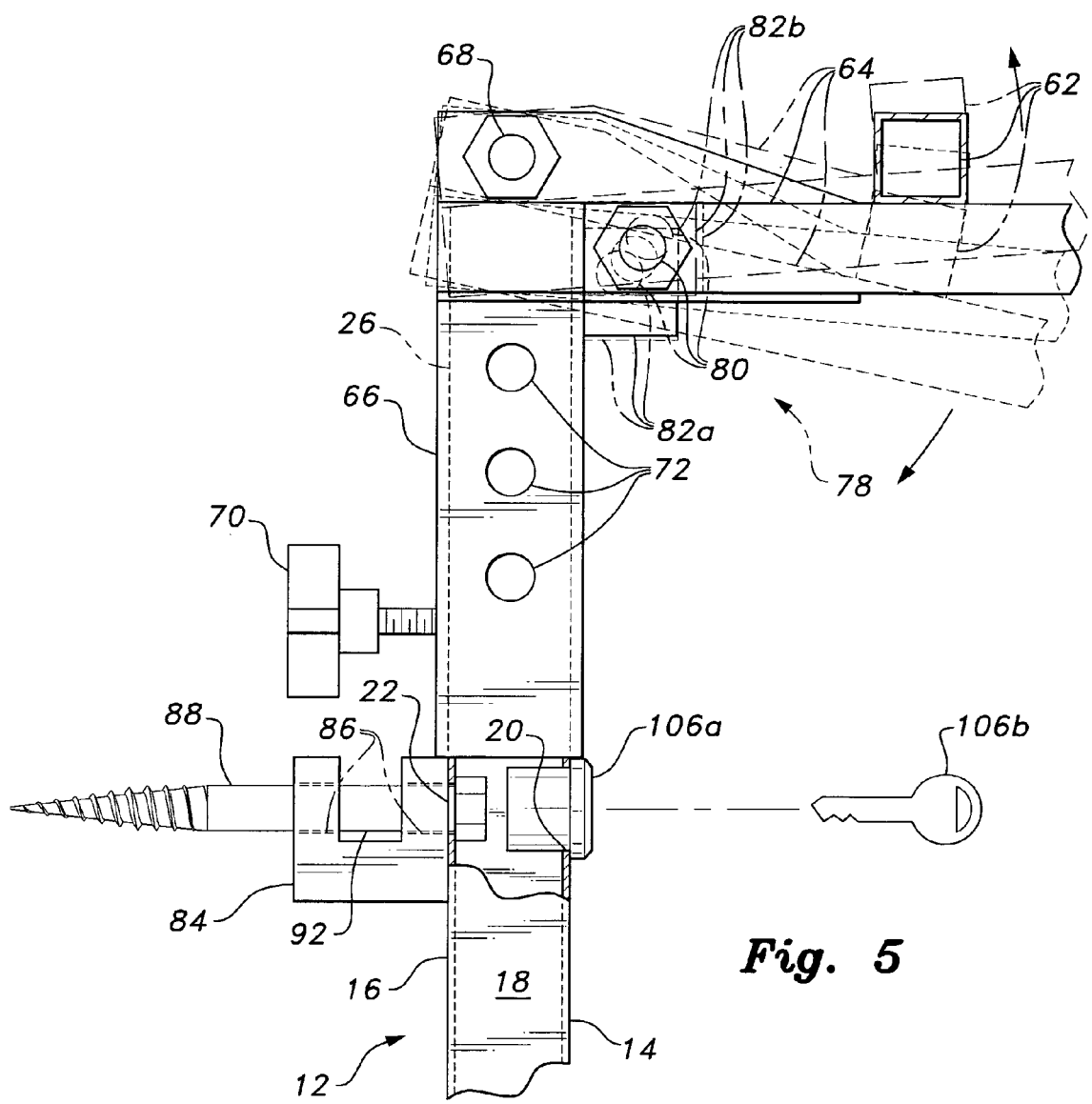
FIG. 5 is a broken away side elevation view of the upper end of the column of the tree stand of FIG. 1 with the removable seat frame installed thereon, showing details permitting angular adjustment of the seat frame.
Figure 6:
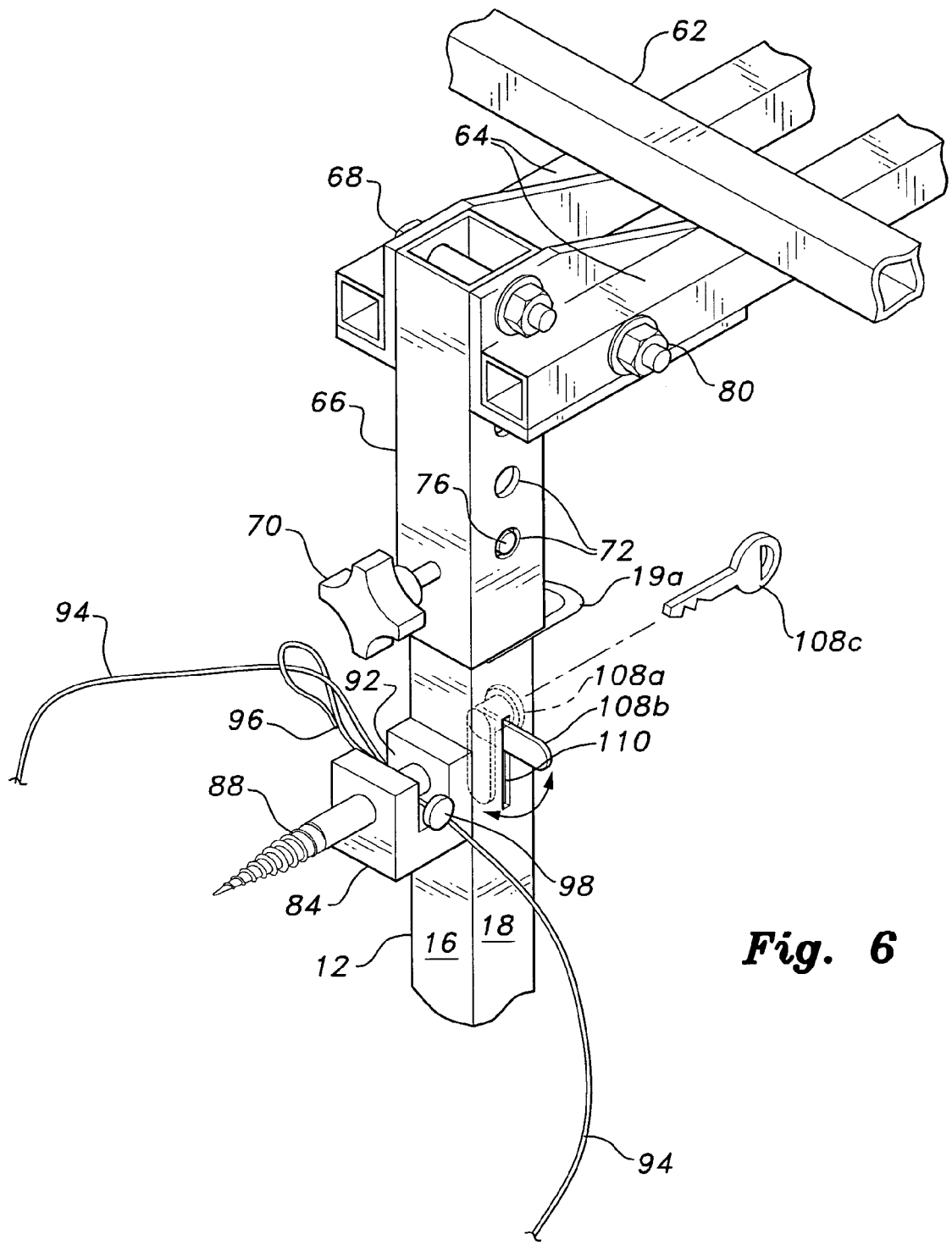
FIG. 6 is a broken away perspective view of the upper end of the fixed column with the removable seat frame installed thereon, showing details of the locking cable mechanism for securing the column to the tree.

FIGS. 4 through 6 provide further details showing the removable attachment of the seat to the upper end of the column 12, and various embodiments of the tree attachment or anchoring mechanisms. The seat includes a frame 62 having a seat attachment bracket 64 comprising a pair of parallel rearwardly extending arms, with a seat installation or attachment tube 66 pivotally captured between the arms of the bracket 64 by a lateral pivot bolt or pin 68. The seat installation tube 66 fits over the upper end 26 of the column 12, and may include a sleeve (not shown) of plastic or other suitable material disposed between the seat installation tube 66 and the upper end 26 of the column 12 to reduce rattling and potential noise.

Further security is provided by a seat installation lock screw 70 threaded through one side of the installation tube 66, serving to tighten the attachment between the tube 66 and column upper end 26 to preclude rattling and noise therebetween. The seat installation tube 66 may include a plurality of lock pin holes 72 formed therethrough, with the upper end 26 of the column 12 having a mating passage 74. A spring-loaded lock pin 76 is installed in the lock pin passage 74 of the upper end of the column 12 and engages a selected pair of the lock pin holes 72 in the seat installation tube 66 to secure the seat assembly in place atop the column 12. The plurality of lock pin holes 72 permits the height of the seat assembly to be adjusted as desired atop the column 12.

The seat frame 62 may also be adjusted angularly relative to the axis of the column 12. The seat attachment bracket 64 includes a selectively pivotable seat angle adjustment block 78 disposed therein. The block 78 has an eccentric lateral passage therethrough and pivots on a lateral seat angle adjustment bolt or pin 80 that passes through the seat attachment bracket 64 and the adjustment block 78. A friction washer, compression spring or the like may be disposed between one end of the block 78 and the adjacent face of the seat attachment bracket 64 to impede free rotation of the block 78.

The adjustment block 78 includes a plurality of faces 82a, 82b, etc., generally as shown in FIG. 5 of the drawings. The block 78 may have a quadrilateral cross section with four angle adjustment bearing faces, or some other polyhedral shape as desired. Due to the eccentric location of the seat angle adjustment pin 80 through the block 78, the distance from the center of the pin 80 and any given face 82a, etc. is different from distance from the pin center to any other face of the block. Thus, the block 78 may be turned or pivoted as desired to position the desired face 82a, etc. to bear against the adjacent face of the seat installation tube 66. This results in the angle of the seat frame 64 changing relative to the seat installation tube 66, and thus the column 12 when the seat assembly is removably secured thereto, allowing the user of the stand 10 to adjust the seat angle as desired.

In the tree stand 10, only the column 12 is permanently or semi-permanently secured to the tree, as noted further above. The platform 28 and seat frame 62 (with seat cushion) are removably and adjustably secured to the column, enabling the user of the stand to remove the platform and seat assembly when the stand is not being used. Various means may be used to secure the column 12 permanently or semi-permanently to the tree, as shown particularly in FIGS. 4 through 6. In each of the embodiments, at least one tree securing cable or band extends from the column 12 circumferentially about the tree. Again, it should be understood that this tree securing band, e.g., cable or band 94, is distinct from the tree anchoring or attachment straps or bands 21a, 21b of FIG. 1 that actually pull the column 12 tightly against the tree to hold the column in place on the tree. In some embodiments, a threaded fastener may also be driven through the column 12 and into the tree for further security.

Accordingly, each embodiment includes at least one band attachment bracket 84 extending from the rear face 16 of the column 12. The band attachment bracket 84 includes a fastener attachment passage 86 therethrough, aligned concentrically with the front and rear tree attachment passages 20 and 22 through the column 12. A threaded fastener 88, e.g., a lag bolt or screw, etc., may be passed through the tree attachment passages 20 and 22 and passage 86 of the bracket 84, and driven into the tree to assist in securing the column 12 to the tree. Alternatively, a shorter unthreaded pin 90 may be used if damage to the tree is to be avoided.

It will be noted that the band attachment bracket 84 includes a lateral slot 92 thereacross, extending through the passage 86. This slot provides for the placement of the ends of a tree-securing band 94 (e.g., cable, chain, strap, etc.) therein, as shown in FIG. 6. The tree securing band 94 includes a first end portion 96 having a loop formed therein, and an opposite second end portion 98 having a swaged or otherwise permanently attached enlargement thereon. The band 94 is passed around the tree, with the swaged second end portion 98 passed through the loop of the first end portion 96. The two end portions 96 and 98 are then placed into the slot 92 of the band attachment bracket 84 with the loop end 96 of the band on one side of the bracket and the swaged or enlarged end 98 of the band on the opposite side of the bracket, and the band retaining pin (either the tree attachment component 88 or unthreaded pin 90) is inserted through the front and rear passages 20 and 22 of the column 12 and fastener attachment passage 86 of the band attachment bracket 84 to capture the end portions 96, 98 of the tree securing band 94 therein.

The swaged second end 98 cannot pass through the narrow gap of the slot 92 beneath the band retaining pin 88 or 90, and the loop of the first end 96 surrounds the opposite end portion of the band 94, thus precluding its passage through the gap of the slot 92 and assuring that the band 94, and thus the column 12, cannot be removed from the tree so long as the band retaining pin 88 or 90 is installed through the column 12 and bracket 84 over the ends 96, 98 of the band 94. The band 94 may include means for the adjustment of its circumference for different tree diameters. Also, it will be seen that the column 12 includes at least one pair of forked lateral grips 100 extending therefrom, to provide a more secure attachment to the tree.

It was noted further above that the first or forward hole 20 in the column 12 is sufficiently large as to allow the head of the band-retaining pin 88 or 90 to pass therethrough. Thus, the head of the pin 88 or 90 abuts the inner wall of the back face 16 of the column 12, when installed therein. This provides clearance for a locking device of some type to be installed over or across the head of the pin 88 or 90, and/or in the larger front passage 20 of the column 12 to prevent removal of the pin 88 or 90 by unauthorized persons. FIG. 4 illustrates one exemplary type of locking assembly that may be used, comprising a trailer hitch type lock that is often used to secure a boat trailer to the hitch assembly of the towing vehicle. The lock comprises a lock pin 102a that installs through a lateral passage 104 of the column 12, with a lock cylinder 102b selectively locking to the end of the pin 102a by means of a key 102c. The lock pin 102a passes over or across the head of the band-retaining pin 88 or 90, to preclude access to its head through the front passage 20 of the column 12.

The structure of FIG. 5 is similar to that of FIG. 4, differing only in the type of lock used. In FIG. 5, a removable cylinder lock 106a, as used in vending machines and the like, is installed within the front passage 20 of the column 12 and secured with a key 106b. The entire lock cylinder 106a is removed from the front passage 20 to access the head of the bolt or pin 88 or 90, for installation or removal of the bolt or pin. Access is denied to the bolt or pin for removal thereof, when the lock cylinder 106*a* is installed. This particular lock configuration and arrangement has the advantage of not requiring additional lock passage or access holes to be formed in the column 12, as are required for other types of lock mechanisms.

FIG. 6 illustrates still another locking means that may be used to prevent removal of the column 12 from its installed location. In FIG. 6, a cam-type lock 108*a* is permanently installed in a passage immediately adjacent the front passage 20 (not shown in FIG. 6, but shown in other views) of the column 12. The lock 108*a* includes a cam-type finger 108*b* pivotally extending therefrom, actuated by a key 108*c*. The finger 108*b* may be selectively positioned over the head of the bolt or pin 88 or 90, to preclude access thereto. A slot 110 may be provided in the side of the column 12, to allow movement of the finger 108*b* for access to the bolt or pin 88 or 90 when the lock 108*a* is unlocked.

The above-described tree stand permits the user of the stand (hunter, wildlife photographer, etc.) to install a column component permanently or semi-permanently at a site, or even to install a series of such columns at different locations. The locking means assures that the column(s) will remain in place when unattended. The user of the stand need only carry a single platform and a single seat to the site of the previously installed column, and temporarily and removably install the platform and seat for use. If the user decides to visit a different site having a previously installed column, he or she may easily remove the seat and platform from the first site and transport them to the next site, as desired. The platform and seat are removed at the end of the day, allowing the user to take those components with him or her for security while resting assured that the column(s) will remain in place for future use.

It is to be understood that the present invention is not limited to the embodiments described above, but encompasses any and all embodiments within the scope of the following claims.

I claim:

1. A tree stand, comprising:
   an elongate, hollow column adapted for at least semi-permanent installation to a tree, the column having a front face, a rear face opposite the front face, mutually opposed first and second lateral faces, an upper end, a lower end opposite the upper end, and at least one front and at least one rear tree attachment passage formed in the front face and rear face thereof in alignment with each other;
   at least one tree attachment component extending from the rear face of the column;
   a lock disposed within the column, the lock selectively locking the tree attachment component to the column;
   a platform removably attached to the lower end of the column and extending therefrom;
   a seat removably attached to the upper end of the column and extending therefrom;
   a seat installation tube removably disposed over the upper end of the column;
   a seat bracket pivotally attached to the seat installation tube, and extending therefrom; and
   a selectively pivotable seat angle adjustment block disposed within the seat bracket, the seat angle adjustment block having a plurality of faces selectively bearing against the seat installation tube.

2. The tree stand according to claim 1, wherein the at least one tree attachment component comprises a threaded fastener disposed through said at least one rear tree attachment passage of the column and extending outwardly therefrom.

3. The tree stand according to claim 1, further including:
   at least one band attachment bracket extending from the rear face of the column;
   a tree securing band having a first end portion and a second end portion opposite the first end portion, each of the end portions being selectively disposed within the band attachment bracket; and
   the at least one tree attachment component includes a band retaining pin disposed through the at least one rear tree attachment passage and the band attachment bracket, the band retaining pin capturing each of the end portions of the tree securing band within the band attachment bracket.

4. The tree stand according to claim 1, further including:
   a plurality of platform stay anchors disposed upon each of the lateral faces of the column;
   first and second platform stays extending from the platform, each of the stays having a platform attachment end and a column attachment end opposite the platform attachment end; and
   a platform stay bracket affixed to the column attachment end of each of the stays, the platform stay bracket being removably and adjustably secured to selected ones of the platform stay anchors of the column.

5. The tree stand according to claim 1, wherein said platform has a plurality of tubular members thereacross, the tree stand further comprising sound dampening material disposed within at least some of the tubular members.

6. A tree stand, comprising:
   an elongate tubular column adapted for at least semi-permanent installation to a tree, the column having a front face, a rear face opposite the front face, mutually opposed first and second lateral faces, an upper end, a lower end opposite the upper end, and at least one front and at least one rear tree attachment passage formed in the front face and the rear face in alignment with each other;
   a threaded fastener disposed through the at least one rear tree attachment passage and extending outwardly therefrom;
   a platform extending from the lower end of the column;
   a seat extending from the upper end of the column;
   at least one band attachment bracket extending from the rear face of the column; and
   a tree securing band having a first end portion and a second end portion opposite the first end portion, each of the end portions being selectively disposed within the band attachment bracket, the threaded fastener capturing each of the end portions of the tree securing band within the band attachment bracket.

7. The tree stand according to claim 6, wherein the platform and the seat are removably attached to the column.

8. The tree stand according to claim 6, further including:
   a plurality of platform stay anchors disposed upon each of the lateral faces of the column;
   first and second platform stays extending from the platform, each of the stays having a platform attachment end and a column attachment end opposite the platform attachment end; and
   a platform stay bracket affixed to the column attachment end of each of the stays, the platform stay bracket being removably and adjustably secured to selected ones of the platform stay anchors of the column.

9. The tree stand according to claim 6, further including:
a seat installation tube removably disposed over the upper end of the column;
a seat bracket pivotally attached to the seat installation tube, and extending therefrom; and
a selectively pivotable seat angle adjustment block disposed within the seat bracket, the seat angle adjustment block having a plurality of faces selectively bearing against the seat installation tube.

10. The tree stand according to claim 6, wherein said platform has a plurality of tubular members thereacross, the tree stand further comprising sound dampening material disposed within at least some of the tubular members.

11. A tree stand, comprising:
an elongate tubular column adapted for at least semi-permanent installation to a tree, the column having a front face, a rear face opposite the front face, mutually opposed first and second lateral faces, an upper end, a lower end opposite the upper end, and at least one front and at least one rear tree attachment passage formed in the front face and rear face in alignment with each other;
at least one band attachment bracket extending from the rear face of the column;
a tree securing band having a first end portion and a second end portion opposite the first end portion, the end portions selectively extending into the band attachment bracket;
an elongate band-retaining pin disposed through the rear tree attachment passage of the column and the band attachment bracket, the pin capturing each of the end portions of the band within the bracket;
a platform extending from the lower end of the column; and
a seat extending from the upper end of the column.

12. The tree stand according to claim 11 further including a lock disposed within the column for selectively locking the band-retaining pin to the rear tree attachment passage of the column and the band attachment bracket.

13. The tree stand according to claim 11, wherein the at least one band-retaining pin is a threaded fastener disposed through the at least one rear tree attachment passage and the band attachment bracket and extending outwardly therefrom.

14. The tree stand according to claim 11, wherein the platform and the seat are removably attached to the column.

15. The tree stand according to claim 11, further including:
a plurality of platform stay anchors disposed upon each of the lateral faces of the column;
first and second platform stays extending from the platform, each of the stays having a platform attachment end and a column attachment end opposite the platform attachment end; and
a platform stay bracket affixed to the column attachment end of each of the stays, the platform stay bracket being removably and adjustably secured to selected ones of the platform stay anchors of the column.

16. The tree stand according to claim 11, further including:
a seat installation tube removably disposed over the upper end of the column;
a seat bracket pivotally attached to the seat installation tube and extending therefrom; and
a selectively pivotable seat angle adjustment block disposed within the seat bracket, the seat angle adjustment block having a plurality of faces selectively bearing against the seat installation tube.

17. The tree stand according to claim 11, wherein said platform has a plurality of tubular members thereacross, the tree stand further comprising sound dampening material disposed within at least some of the tubular members.

* * * * *